United States Patent
Weeks et al.

(10) Patent No.: US 9,038,361 B2
(45) Date of Patent: May 26, 2015

(54) COMBUSTION CONTROLLER

(75) Inventors: Simon A. Weeks, Ashby-de-la-Zouch (GB); Christopher G. Bright, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 926 days.

(21) Appl. No.: 13/180,920

(22) Filed: Jul. 12, 2011

(65) Prior Publication Data
US 2012/0023965 A1 Feb. 2, 2012

(30) Foreign Application Priority Data

Jul. 28, 2010 (GB) .................................. 1012627.4

(51) Int. Cl.
*F02M 27/04* (2006.01)
*F02C 9/50* (2006.01)
(Continued)

(52) U.S. Cl.
CPC *F02M 27/04* (2013.01); *F02C 9/50* (2013.01); *F02C 7/262* (2013.01); *F02C 7/264* (2013.01); *Y02T 50/67* (2013.01)

(58) Field of Classification Search
CPC ............ F02C 7/2365; F02C 7/25; F02C 9/16; F02C 9/50; F05D 2260/14; F23R 3/002; F23R 3/10; F23R 3/12; F23R 3/16; F23R 3/18; F23R 3/286; F23R 3/30; F23R 3/32; F23R 2900/00009; F23R 2900/00008; F23D 14/84; B64G 1/405; F03H 1/00; F03H 1/0037; F03H 1/005; F03H 1/0062; F03H 1/0068; F03H 1/0075; F03H 1/0087; F03H 1/0093; F03H 1/0081
USPC ........... 60/734, 737, 739, 749, 751, 202, 204; 431/8, 12, 9
See application file for complete search history.

(56) References Cited

U.S. PATENT DOCUMENTS 3,324,316 A * 6/1967 Cann ............................. 376/141
4,357,237 A 11/1982 Sanderson
5,045,741 A * 9/1991 Dvorsky ....................... 310/209
(Continued)

FOREIGN PATENT DOCUMENTS

GB 1013015 12/1965
GB 1140862 1/1969
(Continued)

OTHER PUBLICATIONS

Rietjens, "The Future for MHD Power Generation," Physics Technology, 1979, pp. 216-221, vol. 10, The Institute of Physics, Great Britain.
(Continued)

*Primary Examiner* — Andrew Nguyen
(74) *Attorney, Agent, or Firm* — Oliff PLC

(57) ABSTRACT

The present invention relates to a combustion controller for controlling the combustion of a flow of combustible and/or combusting fluid. The combustion controller comprises an inlet and an outlet which defines a flow path between them. A magnetic-field generator is arranged to generate a magnetic field across the flow path such that in use the fluid flows in the flow path through the magnetic field. As the fluid flows through the magnetic field an electric current is induced in the fluid. This results in energy being supplied to the fluid. This energy can assist is reignition. If the magnetic field is an alternating magnetic field then this induces an alternating current in the fluid. The frequency of this current can be controlled such that certain chemical reactions are either promoted or inhibited.

21 Claims, 20 Drawing Sheets

(51) Int. Cl.
*F02C 7/262* (2006.01)
*F02C 7/264* (2006.01)

(56) References Cited

U.S. PATENT DOCUMENTS

| | | | | |
|---|---|---|---|---|
| 5,188,336 | A * | 2/1993 | Graner et al. | 251/129.16 |
| 2005/0210859 | A1 * | 9/2005 | Bossmann et al. | 60/202 |
| 2007/0138077 | A1 * | 6/2007 | Timms et al. | 210/222 |
| 2007/0261383 | A1 | 11/2007 | Hartmann et al. | |
| 2010/0089027 | A1 * | 4/2010 | Muldoon | 60/202 |

FOREIGN PATENT DOCUMENTS

| JP | A-1-253558 | 10/1989 |
|---|---|---|
| WO | WO 2005/005817 A1 | 1/2005 |

OTHER PUBLICATIONS

Joseph, "Flame Amplification and a Better Hi-Fi Loudspeaker? Music from the Fireplace May Be around the Corner," Popular Electronics, May 1968, pp. 47-53.

Stangeby, "A Review of the Status of MHD Power Generation Technology Including Suggestions for a Canadian MHD Research Program," Institute for Aerospace Studies, Nov. 1974, UTIAS Review No. 39, University of Toronto.

British Search Report dated Nov. 3, 2010 issued in British Patent Application No. 1012627.4.

* cited by examiner

B-B

COMBUSTION CONTROLLER

The invention relates to a combustion controller, and particularly, although not exclusively, to a magnetic combustion controller for a gas turbine engine.

A gas turbine engine comprises a compressor, a combustion chamber and a turbine. The compressor draws in air and pressurises it. This pressurised air is then fed to the combustion chamber where it is combusted with fuel. This causes the temperature and volume of the air to increase. The high-pressure, high-temperature air then expands through the turbine, thereby generating energy.

In the combustion chamber a flame is generated by the combustion of fuel. The fast flow of air through the combustion chamber makes it necessary to shield the flame in order to prevent it from being extinguished. It is known to use a device known as a flameholder (or flame can) for this purpose. As shown in FIG. 1, one type of flameholder comprises a perforated metal can 3 which shields the flame 5 from the flow of air 6 through the combustion chamber. The perforations 4 in the can allow air into the can 3 so as to maintain combustion. The perforations 4 in the can are designed so as to allow just enough air into the can for stoichiometric combustion.

The above described flameholder is simple and is satisfactory for some circumstances. However, if the flame is extinguished then it is difficult to reignite the fuel, especially at high altitude and high speed.

It is known to supply plasma to the flame and/or fuel in order to control combustion and assist in reignition. However, it is necessary to provide radio-frequency or microwave generators to generate the plasma.

It is therefore desirable to provide a combustion controller that can assist relight of a flame.

According to a first aspect of the present invention there is provided a combustion controller for controlling the combustion of a flow of combustible and/or combusting fluid, comprising:
an inlet and an outlet defining a flow path between them, and
a magnetic-field generator arranged to generate a magnetic field across the flow path, the magnetic-field generator comprises a first pole piece having a cavity within which a second pole piece is located in such a way that an opening is formed between the first and second pole pieces which in use provides the flow path for the fluid and across which the magnetic field is generated,
wherein in use the fluid flows in the flow path through the magnetic field, which then induces a flow of electric current in the fluid, thereby supplying energy to the fluid, the flow path is in the form of a closed loop in a plane perpendicular to the flow direction such that in use the induced current can flow in a closed loop entirely within the fluid.

This allows energy to be supplied to the combustible fluid which makes reignition easier. The current induced in the fluid may also promote or hinder certain chemical reactions. Because the current flows entirely within the fluid it is not necessary to provide electrodes which would be susceptible to erosion and would need to be replaced periodically. The closed loop may be generally annular.

The first pole piece may be generally annular and the second pole piece is generally cylindrical, the first and second pole pieces being concentric, so that the flow path is annular in a plane perpendicular to the flow direction,
The magnetic-field generator may generate an alternating magnetic field. This results in an alternating current being induced in the fluid. The frequency of the alternating current may be chosen so as to hinder or promote certain chemical reactions. In one embodiment the alternating magnetic field is combined with a steady magnetic field and the steady magnetic field is always in the same direction. This provides a force on the fluid that is always in a particular direction. This may help to prevent a flame from being blown out. The magnetic field may be a combination of two or more frequencies.

In a particularly preferred arrangement the magnetic-field generator comprises first and second electromagnets, each including a pole piece and a winding. This allows the strength of the magnetic field, and hence the current induced in the fluid, to be readily controlled. The magnetic field generator may further comprise a pair of permanent magnets.

A plurality of burners may be located within the inlet. This provides a particularly compact arrangement.

The first pole piece may have a first recess and a second recess on an inner surface and the second pole piece has a first recess and a second recess on an outer surface.

The first recess on the inner surface of the first pole piece may be spaced from the inlet by an inlet portion of the inner surface of the first pole piece, the first recess is spaced from the second recess on the inner surface of the first pole piece by a separating portion of the inner surface of the first pole piece, the second recess on the inner surface of the first pole piece is spaced from the outlet by an outlet portion of the inner surface of the first pole piece, the length of the separating portion is less than the length of the inlet portion and the length of the separating portion is less than the length of the outlet portion.

The first recess on the outer surface of the second pole piece may be spaced from the inlet by an inlet portion of the outer surface of the second pole piece, the first recess is spaced from the second recess on the outer surface of the second pole piece by a separating portion of the outer surface of the second pole piece, the second recess on the outer surface of the second pole piece is spaced from the outlet by an outlet portion of the outer surface of the second pole piece, the length of the separating portion is less than the length of the inlet portion and the length of the separating portion is less than the length of the outlet portion.

A first winding may be located in the first recess and a second winding is located in the second recess of the first pole piece.

A first winding may be located in the first recess and a second winding is located in the second recess of the second pole piece.

The separating portion of the first pole piece between the first recess and the second recess of the first pole piece may comprise a permanent magnet.

The separating portion of the second pole piece between the first recess and the second recess may comprise a permanent magnet.

At least one fuel burner may be located within the inlet between the first pole piece and the second pole piece. A plurality of fuel burners may be located within the inlet between the first pole piece and the second pole piece. The at least one fuel burner may be positioned upstream of the magnetic field generator.

The invention is also concerned with a combustion system or device, such as a gas turbine engine, comprising a combustion controller according to any statement herein.

According to a second aspect of the invention there is provided a method of controlling combustion, comprising:
causing a flow of combustible and/or combusting fluid to flow along a flow path from an inlet to an outlet; and
generating a magnetic field across the flow of the fluid in such a way that current is induced in the fluid, thereby supplying energy to the fluid, wherein the fluid flows in the form of a closed loop in a plane perpendicular to the flow direction and the induced current flows in a closed loop entirely within the fluid.

Preferably the magnetic field is an alternating magnetic field. The alternating magnetic field may be combined with a steady magnetic field and the steady magnetic field is always in the same direction. The alternating magnetic field may be a combination of two or more frequencies.

The first pole piece may have a first recess and a second recess on an inner surface and the second pole piece has a first recess and a second recess on an outer surface.

The invention may comprise any combination of the features and/or limitations referred to herein, except combinations of such features as are mutually exclusive.

Embodiments of the present invention will now be described, by way of example only, with reference to the accompanying drawings, in which:

FIG. 1 schematically shows a previously considered flame-holder;

FIG. 2 schematically shows a combustion controller according to a first embodiment of the present invention;

FIG. 3 schematically shows the cross section A-A of FIG. 2;

FIG. 4 schematically shows the combustion controller of FIG. 2 positioned at the opening of a fuel supply conduit;

FIG. 5 schematically shows a combustion controller according to a second embodiment of the present invention;

FIG. 6 schematically shows the cross section B-B of FIG. 5;

FIG. 7 schematically shows a combustion controller according to a third embodiment of the present invention;

FIGS. 8, 8A and 8B show possible electrical connections of the windings of FIG. 7;

FIG. 9 schematically shows a combustion controller according to a fourth embodiment of the present invention;

Figure 13:
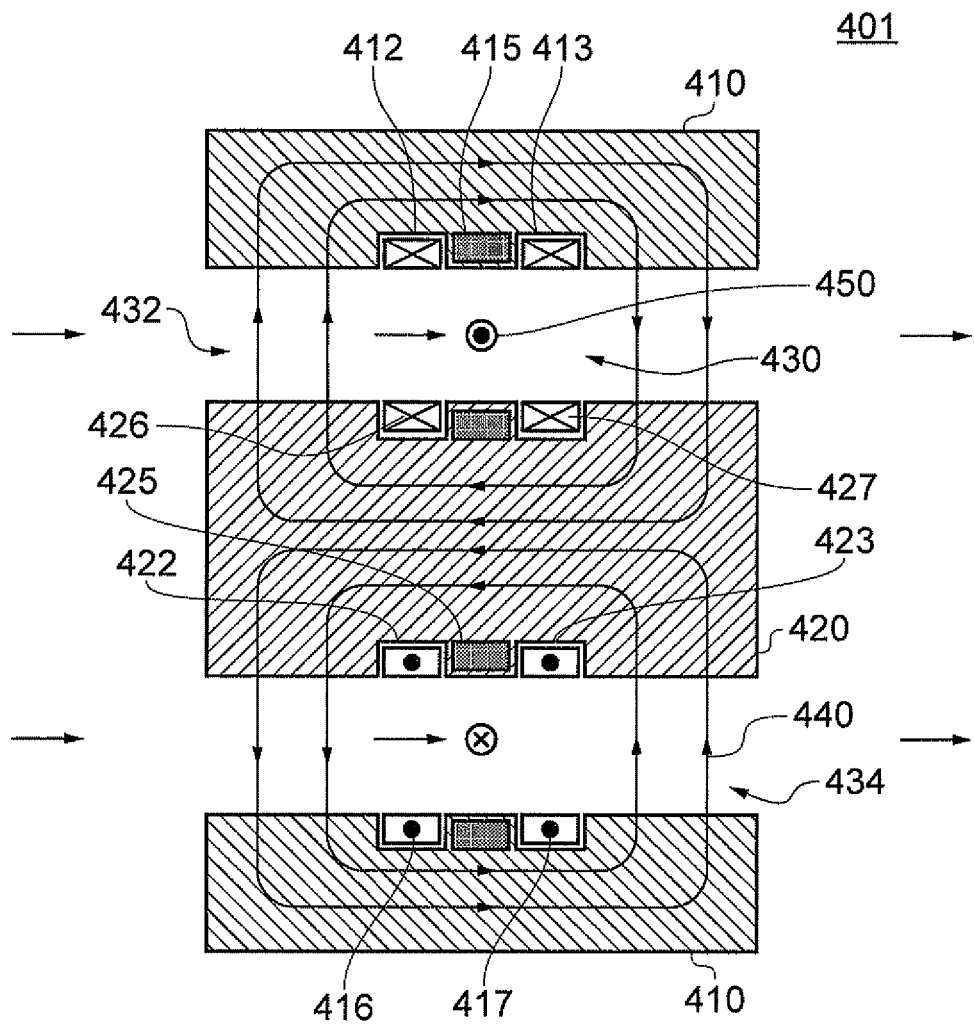
Figure 14:
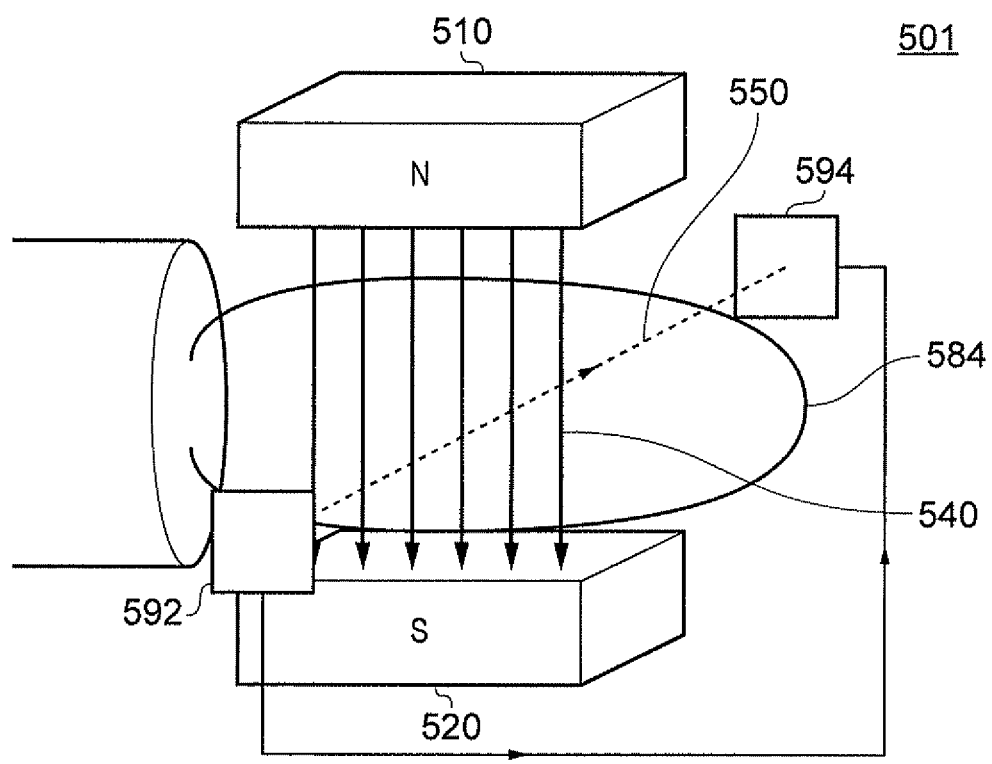

FIG. 13 schematically shows a combustion controller according to a fifth embodiment of the present invention; and FIG. 14 schematically shows a combustion controller according to a sixth embodiment of the present invention.

Figure 1:
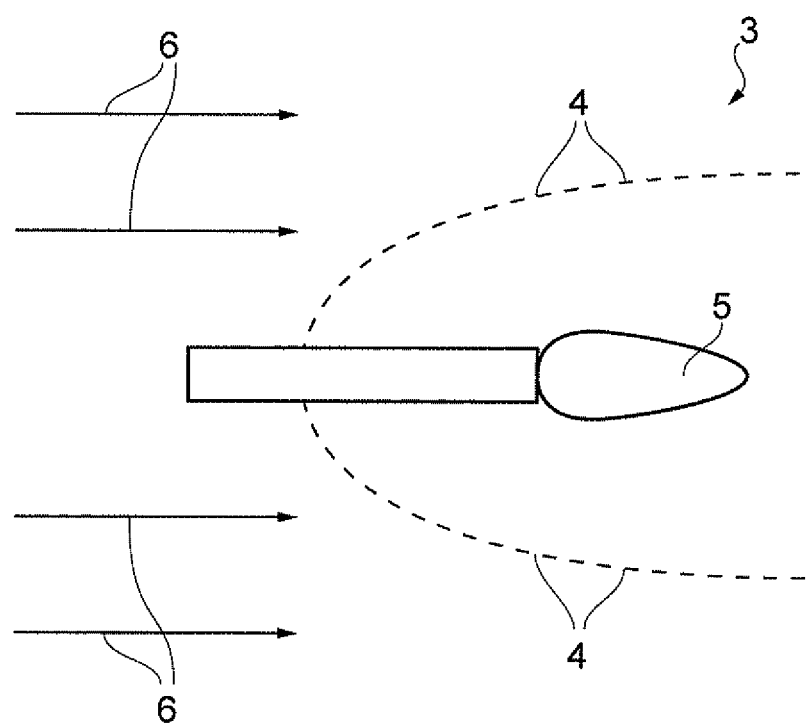
Figure 2:
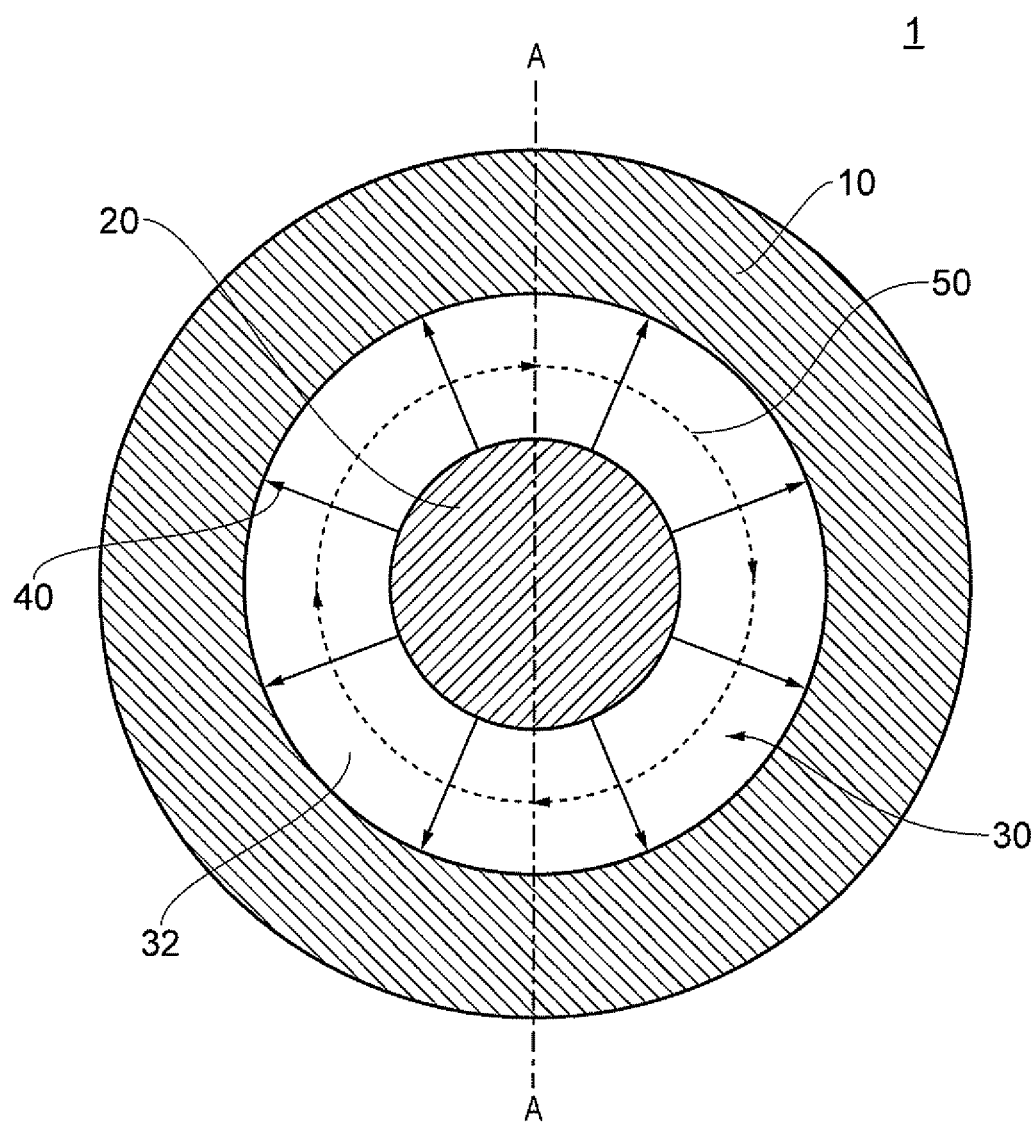
Figure 3:
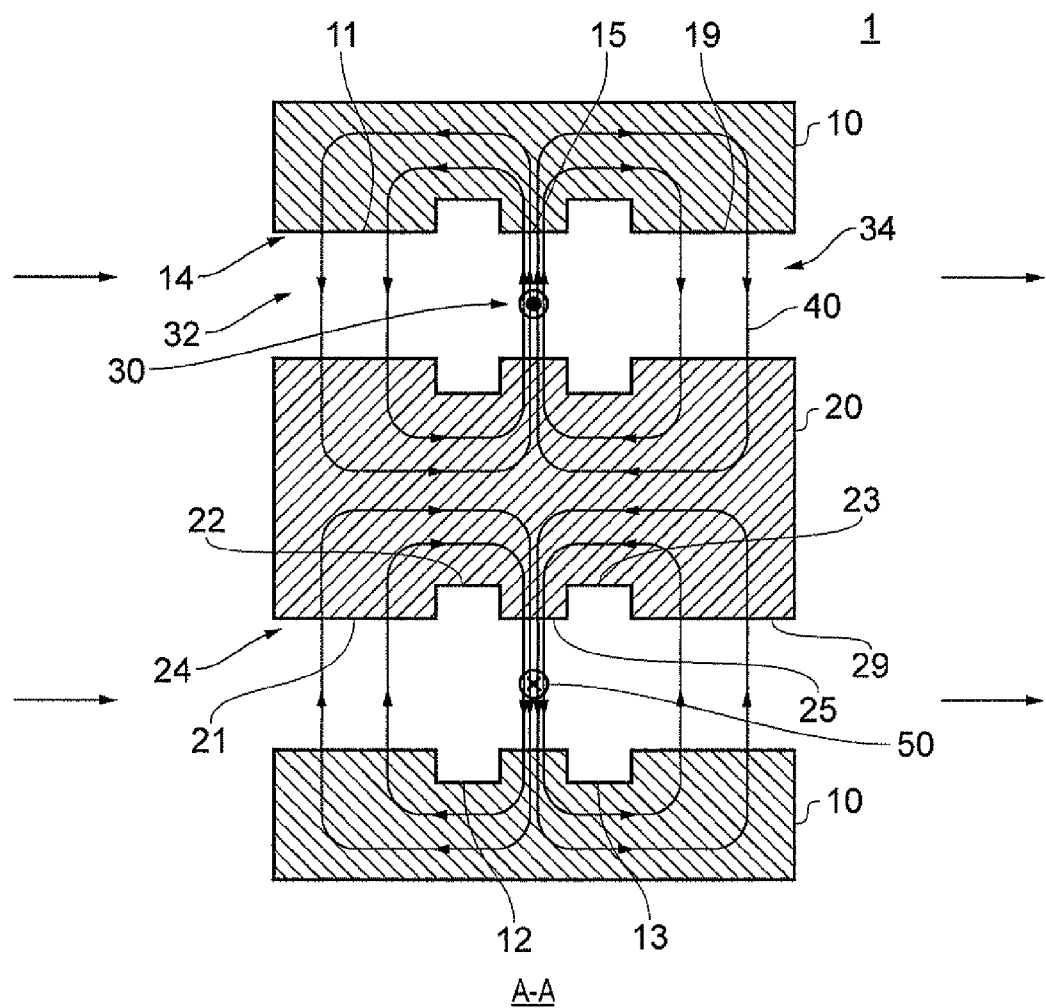
Figure 15:
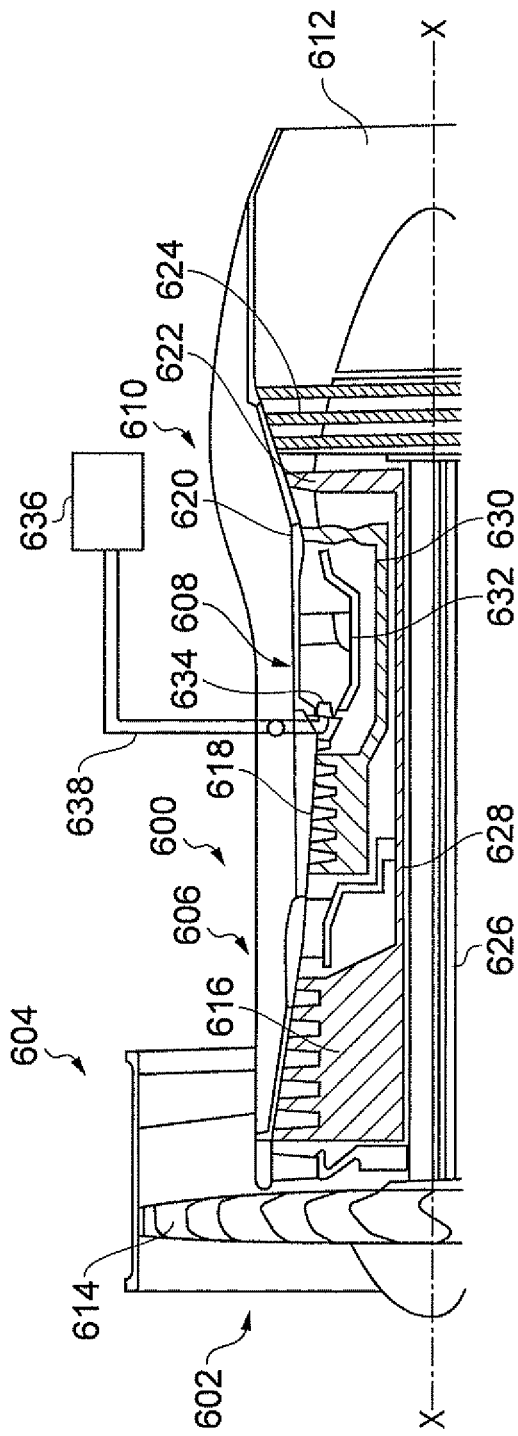

FIG. 15 shows a gas turbine engine having a combustion controller according to the present invention, FIGS. 2 and 3 show a first embodiment of a combustion controller 1. The combustion controller 1 comprises a magnetic-field generator in the form of an outer annular magnetic pole piece 10 and an inner cylindrical magnetic pole piece 20. The outer and inner pole pieces 10, 20 are concentric with one another and an annular opening (or gap) 30 between them defines a flow path having an inlet 32 and an outlet 34. Supports (not shown) attach the inner cylindrical magnetic pole piece 20 to the outer annular magnetic pole piece 10.

Referring specifically to FIG. 3, the outer pole piece 10 comprises first and second annular recesses 12, 13 on an inner surface 14 and the inner pole piece 20 comprises corresponding first and second annular recesses 22, 23 on an outer surface 24. The recesses 12, 13 of the outer pole piece 10 are separated by a non-recessed separating portion 15 and are spaced from the inlet 32 and the outlet 34 by non-recessed inlet and outlet portions 11, 19. Similarly, the recesses 22, 23 of the inner pole piece 20 are separated by a non-recessed separating portion 25 and are spaced from the inlet 32 and the outlet 34 by non-recessed inlet and outlet portions 21, 29. The magnetic pole pieces 10, 20 may be made of any magnetic material.

The magnetic pole pieces 10, 20 create a radial magnetic field 40. The magnetic flux in the region of the non-recessed separating portions 15, 25 is the sum of the magnetic flux in the regions of the non-recessed inlet and outlet portions 11, 19, 21, 29. The sum of the areas of the separating portions 15, 25 is significantly less than the sum of the areas of the inlet and outlet portions 11, 19, 21, 29. This arrangement ensures that the magnetic field 40 is much higher in the region of the separating portions 15, 25 than anywhere else in the combustion controller.

Figure 4:
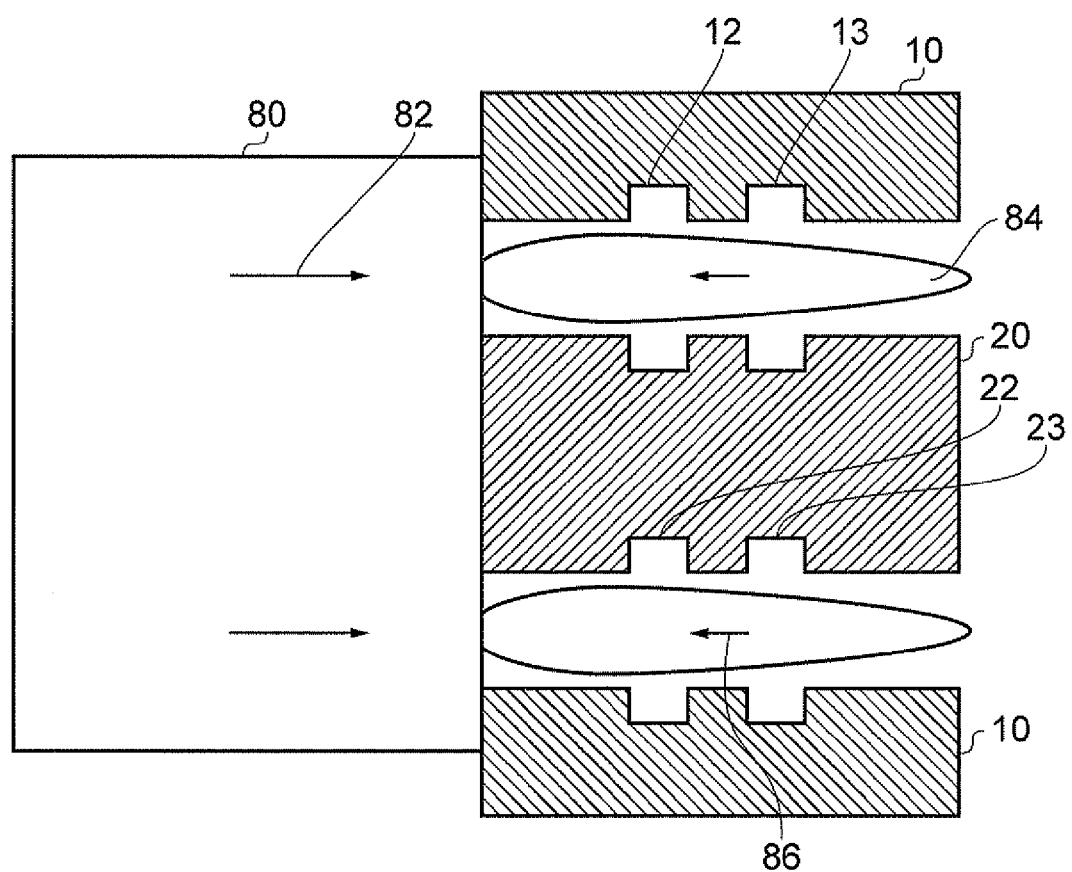

As shown in FIG. 4, in use the combustion controller 1 is positioned at the opening of a fuel supply conduit 80 that supplies combustible fluid flowing in a first direction 82. The fluid flows through the annular opening 30 of the combustion controller 1 and when ignited generates a flame 84 that is positioned in the region of the annular opening 30.

The flame 84 is considered to be a region where combustion of the combustible fluid occurs. There is flow of matter through this region that includes fuel and products of combustion. The flame 84 can therefore be considered to be a flow of combusting fluid. The term 'flame flow' will be used to mean a flow of combusting fluid.

As a result the heat generated by combustion of the fluid, the fluid undergoes thermal ionization. This means that the flame is capable of conducting current.

As shown in FIGS. 2 and 3, the annular flame flow in the annular opening 30 interacts with the radial magnetic field 40 generated between the outer and inner pole pieces 10, 20 as follows.

The flame 84 flows perpendicularly through the magnetic field 40 in the annular opening 30. Since the flame 84 is an ionized gas, a current 50 is induced in the flame 84 in a direction perpendicular to the flow direction 82 and to the magnetic field 40. As shown in FIG. 2, this results in an annular current 50 flowing in the annular flame 84.

This annular electric current 50 within the flame supplies electrical energy to the flame 84 which, depending on the strength and frequency of the current, can promote or inhibit certain chemical reactions that occur during combustion.

If the flame 84 is extinguished then combustible fluid flows through the annular opening 30. Providing that the combustible fluid is ionized, an annular current 50 is induced in the fluid flow in a similar manner as occurs with the flame 84.

The annular current 50 flowing within the combustible fluid supplies energy to the combustible fluid. This increases the energy of the combustible fluid and makes reignition of the fluid easier.

The combustion controller 1 therefore both controls combustion and assists in reignition of combustible fluid.

The annular current flow 50 also interacts with the magnetic field to produce a Lorentz force 86 on the flame 84. This force is perpendicular to the current flow 50 and to the magnetic field 40 and is in the opposite direction to the flame flow. This Lorentz force 86 holds the flame 84 in the desired position and is known as the flame holding force.

Figure 5:
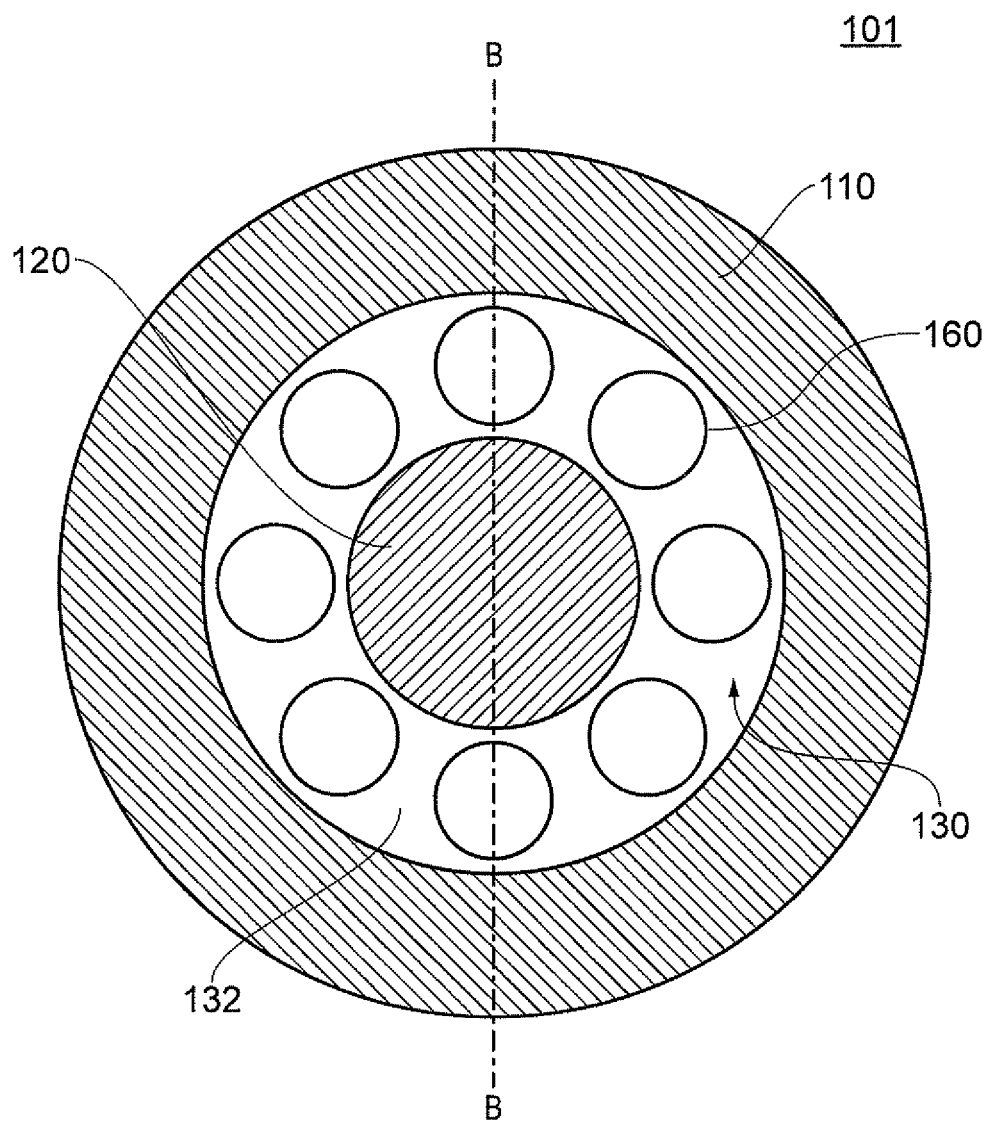
Figure 6:
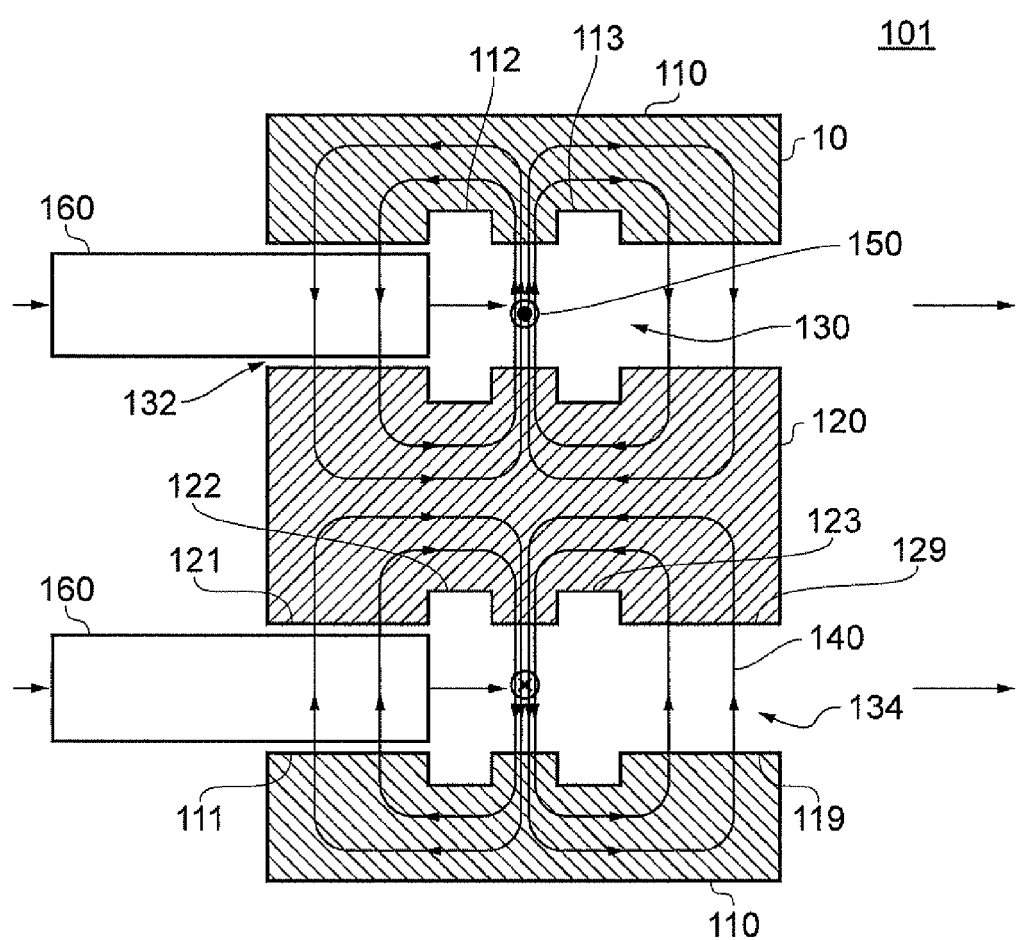

FIGS. 5 and 6 show a combustion controller 101 according to a second embodiment of the invention. In this embodiment a number of fuel burners 160 are located in the annular opening 130. An air gap is provided between the burners and the outer and inner pole pieces 110, 120 to allow air into the combustion controller 101. The fuel burners 160 ensure that combustion does not occur in the region of the non-recessed inlet portions 111, 121. This is desirable because in this region the magnetic flux density is low and hence only a small annular current would be induced in the flame.

In order to discourage an annular current from forming in the region of the non-recessed outlet portions 119, 129, these portions may be cooled. This has the effect of cooling the combustion products which reduces ionization, thus inhibiting an annular current from forming. Cooling may be achieved by providing ducts within the outer and inner pole pieces 110, 120 through which a cooling fluid, such as air, may be introduced.

The above described arrangement of FIGS. 5 and 6 also provides a more compact arrangement. In order to improve the magnetic circuit of the combustion controller 101, the burners 160 can be made of a low-loss magnetic material such as a laminated electric steel, or a high-resistivity magnetic material such as ferrite. This reduces losses due to eddy currents and magnetic hysteresis.

Figure 7:
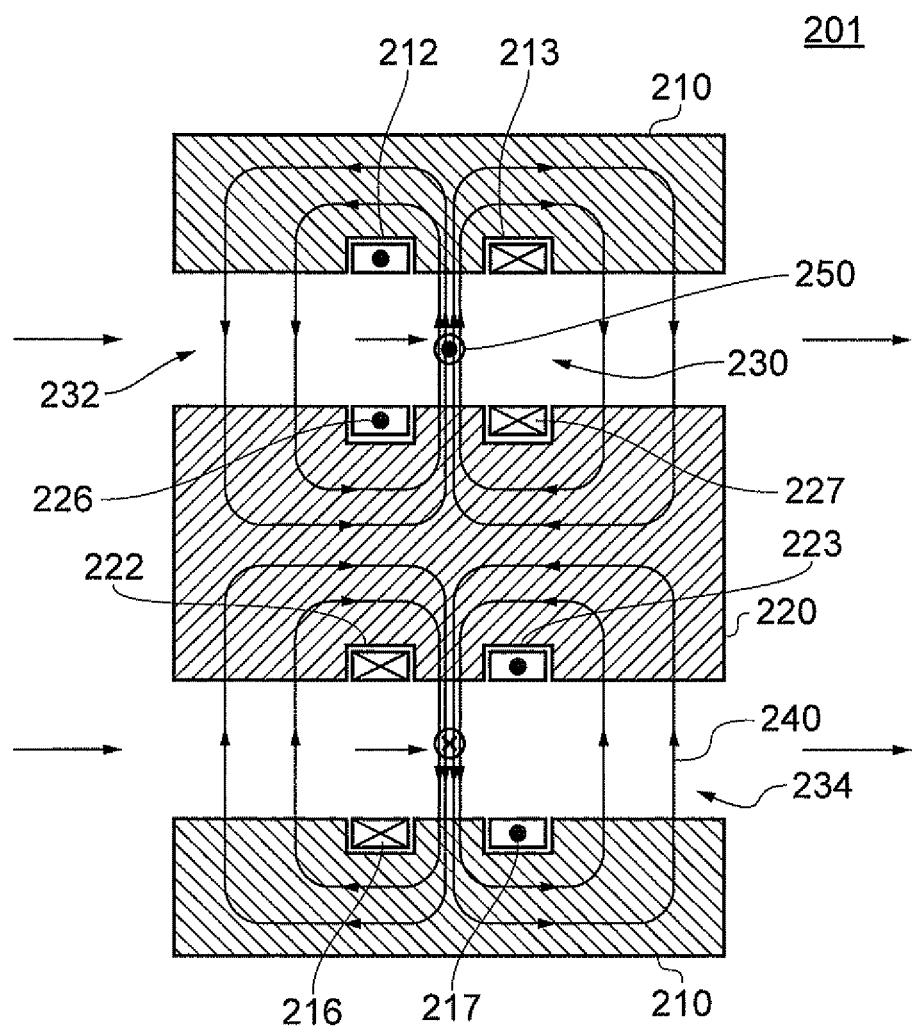
Figure 8:
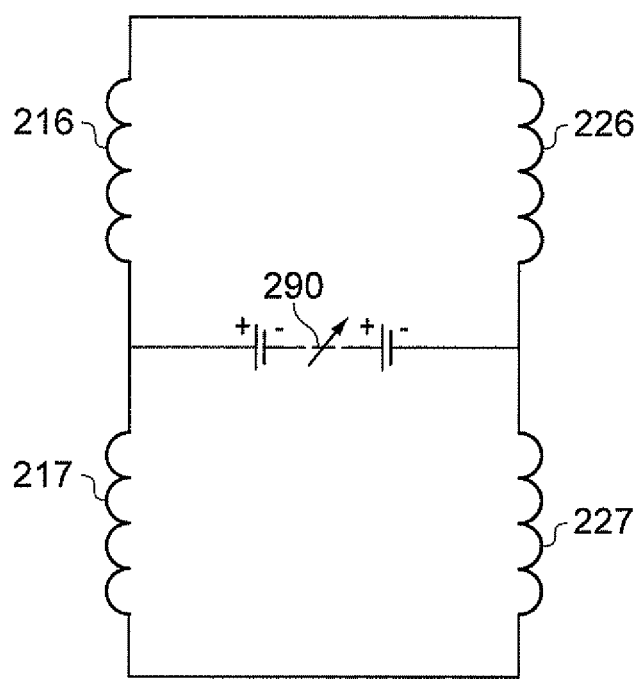

FIG. 7 shows a combustion controller 201 according to a third embodiment of the invention. In this embodiment first and second outer windings 216, 217 are located in the first and second recesses 212, 213 of the outer pole piece 210. Similarly, first and second inner windings 226, 227 are located in the first and second recesses 222, 223 of the inner pole piece 220. The windings 216, 217, 226, 227 are connected to a variable DC power supply 290 as shown in FIG. 8. This produces a radial magnetic field 240 between the pole pieces 210, 220. The direction of the magnetic field 40 depends on the direction of the flow of current in the windings. The variable DC power supply 290 allows the current in the windings to be varied, thus altering the strength of the magnetic field 240. This allows the annular current 250 induced in a flame or a combustible fluid to be altered. This means that more or less energy can be supplied to the fluid, depending on the operating requirements.

The pole pieces 210, 220 may be made of any suitable material such as a low-loss magnetic material. Examples include laminated electric steels and high-resistivity magnetic materials such as ferrite.

Figure 8A:
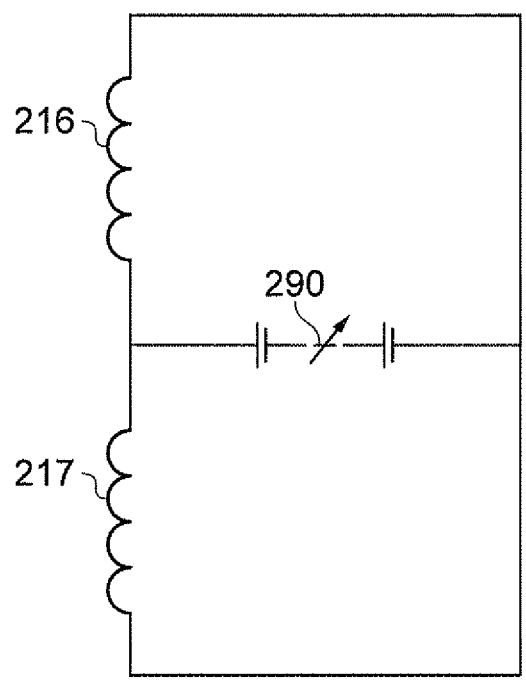

The electrical connections may be simplified by omitting the electrical windings 226 and 227 on the inner pole piece 220. This would avoid the need to install electrical conductors in the gap between the inner pole piece 220 and the outer pole piece 210. In such a case, the magnetic field between the inner pole piece 220 and the outer pole piece 210 would rely upon the windings 216 and 217 on the outer pole piece. FIG. 8A shows a circuit that would incorporate the windings 216 and 217 in order to provide a steady magnetic field between the inner pole piece 220 and the outer pole piece 210.

Figure 8B:
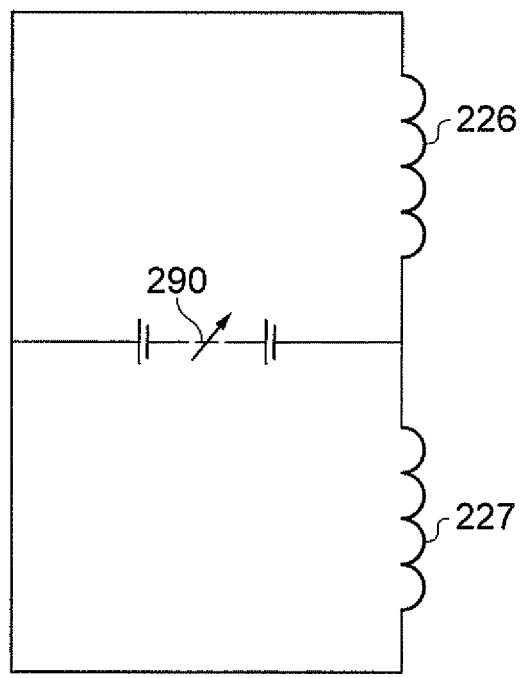

In another embodiment, the electrical connections may be simplified by omitting the electrical windings 216 and 217 on the outer pole piece 210. In such a case, the magnetic field between the inner pole piece 220 and the outer pole piece 210 would rely upon the windings 226 and 227 on the inner pole piece 220. FIG. 8B shows the circuit that would incorporate the windings 226 and 227 in order to provide a steady magnetic field between the inner pole piece 220 and the outer pole piece 210.

Figure 9:
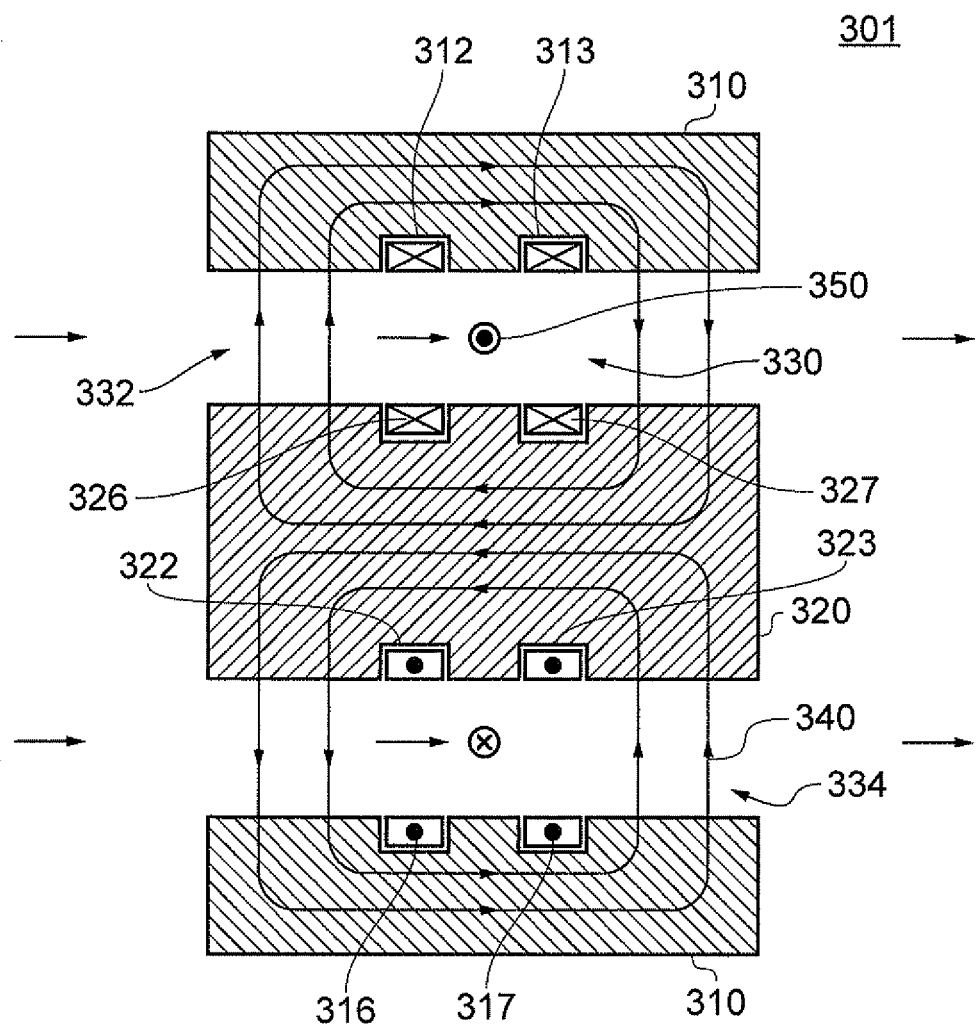
Figure 10:
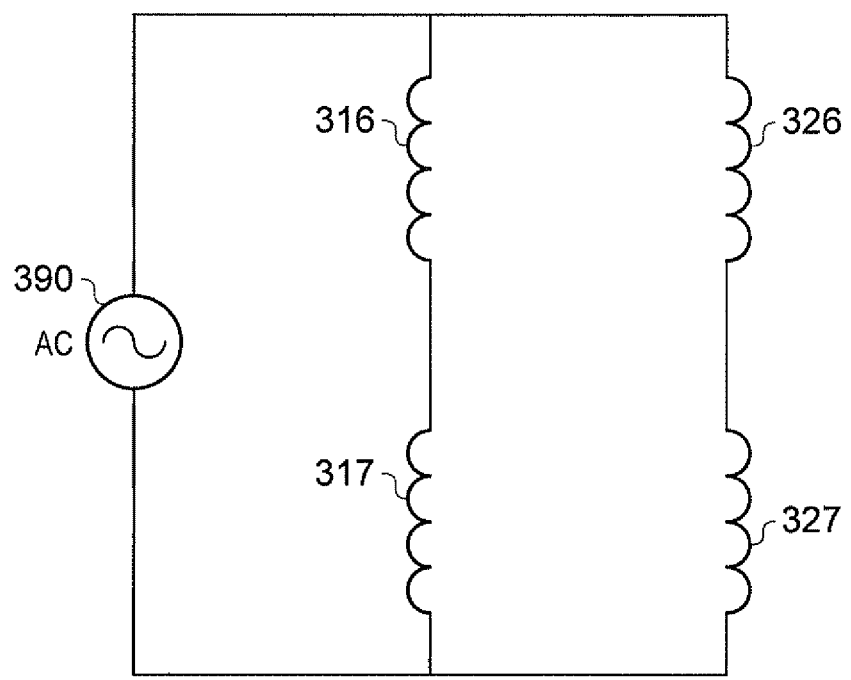
FIGS. 10 and 10A show possible electrical connections of the windings of FIG. 9.

FIGS. 9 and 10 show a combustion controller 301 representing a fourth embodiment of the invention. In this embodiment the first and second outer windings 316, 317 and the first and second inner windings 326, 327 are supplied with alternating current flows which are synchronized with one another. FIG. 10 shows the connection arrangement of the windings and the AC power supply 390. The term 'AC' means any varying current, not necessarily sinusoidal or periodic.

The alternating current supplied to the windings 316, 317, 326, 327 generates an alternating magnetic field 340. When in use, this alternating magnetic field 340 induces an alternating annular current 350 in the flame or combustible fluid (depending on the state of operation). The frequency of the annular current 350 is intrinsically linked to the frequency of the current supplied to the windings.

Inducing an alternating annular current 350 in the flame or combustible fuel provides a number of advantages.

The alternating annular current 350 induced in the flame acts to heat the flame. Depending on the frequency of the induced current this has the effect of increasing or decreasing certain chemical reactions. The heating and chemical effects, affect the sound emitted by the combustion. If an appropriate frequency is chosen, the sound emitted due to combustion can be reduced.

Flames contain ions of various species. These will have an ion cyclotron frequency corresponding to the gyration of that species of ion in a DC magnetic field. Generating an alternating magnetic field 340 with a frequency equal to the ion cyclotron frequency of a particular species of ion supplies energy to those particular ions. This is known as "resonant cyclotron absorption". The combustion controller 301 can therefore use resonant cyclotron absorption to influence the combustion of the fluid by favouring a particular chemical reaction involving a particular species of ion. Alternatively, it can be used to hinder a chemical reaction involving a particular species of ion. Controlling chemical reactions in this way may help to reduce emissions such as nitrous oxides, for example.

Figure 11:
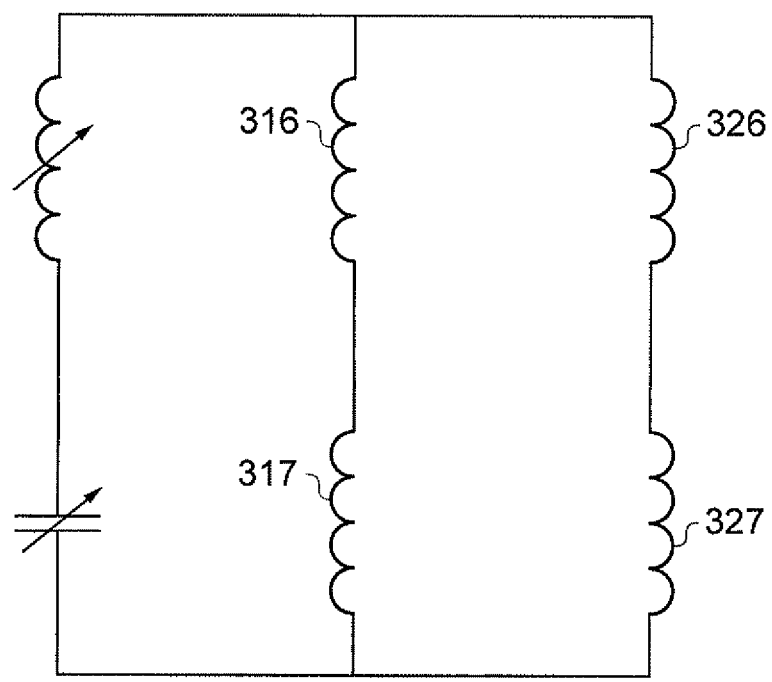
FIGS. 11 and 11A show alternative electrical connections of the windings of FIG. 9.

FIG. 11 shows a resonant circuit connected to the windings 316, 317, 326, 327. This circuit can be used to extract energy from selected ions in the flame by tuning the circuit to the Lamour frequency of a particular ion species. This may control combustion of the fuel by favouring a particular chemical reaction involving a particular species of ion. Alternatively, it can be used to hinder a chemical reaction involving a particular species of ion. FIG. 11 shows a series LC resonant circuit but other resonant circuits (for example a parallel LC resonant circuit) could be used.

Figure 12:
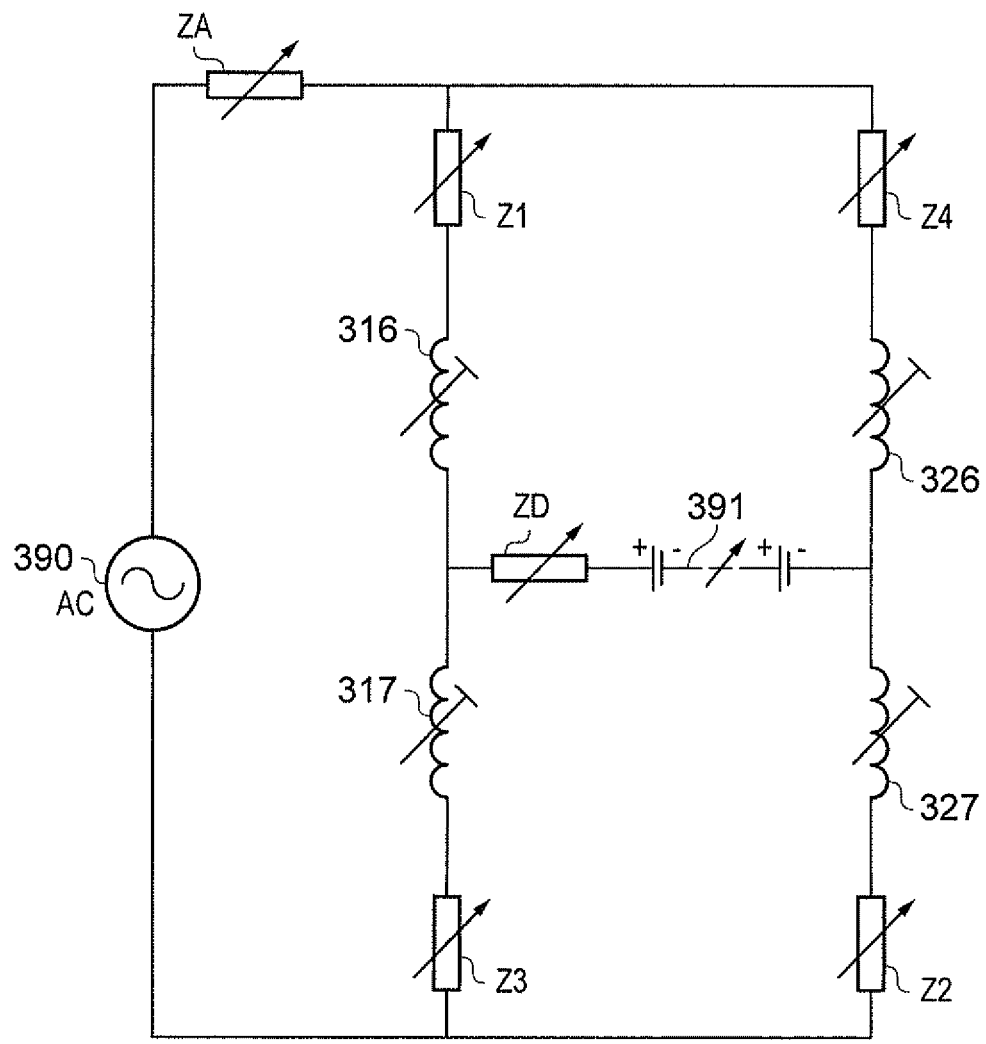
FIGS. 12 and 12A show further alternative electrical connections of the windings of FIG. 9.

FIG. 12 shows a circuit that applies both DC and AC to the flame or combustible fluid. This circuit is known as a balanced bridge. Providing that the windings 316, 317, 326, 327 are balanced, no AC will flow through the DC supply 391 and no DC will flow through the AC supply 390. Balancing may be achieved or improved by using adjustable balancing impedances Z1, Z2, Z3, Z4 or by using tapped windings. In addition to this, it may be necessary to use blocking impedances or filters ZA, ZD to block DC flowing through the AC supply and AC flowing through the DC supply.

AC magnetic fields produce eddy currents and magnetic hysteresis losses in the materials in which they flow. Therefore, most of the combustion controller 301 should be made from a low-loss magnetic material. Examples of such materials include electric steels or ferrites. These materials may be laminated using known lamination techniques.

It is also possible to improve combustion control by supplying two or more AC currents of different frequencies to the windings 316, 317, 326, 327. For example, if two frequencies f1 and f2 are used, non-linear effects in the annular current 350 will generate additional frequencies including the sum frequency (f1+f2) and the difference frequency (f1−f2) of the original two frequencies. Heterodyne operation could therefore be used to improve the performance of the combustion controller.

For example, if the combustion controller 301 operates efficiently over a band of frequencies including f1 and f2, but combustion control is required at a different frequency fc, the frequencies f1 and f2 can be chosen so that frequency required for combustion control fc is the sum or the difference of the frequencies f1, f2. For example, if combustion control at fc=100 kHz is required but the combustion controller operates more efficiently at lower frequencies, f1 can be made 40 kHz and f2 can be made 60 kHz so that the sum of f1 and f2 is the frequency required for combustion control (i.e. fc=f1+f2=100 kHz).

Heterodyne operation could be achieved by using transformers, filters or other suitable devices to supply two or more AC voltages to the windings.

In order to improve the electrical conductivity of the flame 84 or combustible fluid this fluid may be seeded with easily ionisable materials such as alkali or alkaline earth metals or their compounds.

The performance of the combustion controller 1 can also be improved by further ionisation of the flame 84 or combustible fluid within the combustion controller 1. This may be done by irradiating the flame 84 or fluid with electromagnetic radiation such as microwaves, ultraviolet, X-rays or gamma rays, for example, or with corpuscular radiation such as alpha rays, beta rays, or beams of ions, for example. The flame or fluid may also be seeded with chemicals such as alkali metals or their compounds or with radioactive substances. Modulating the means of ionisation may also improve the control of combustion.

Heterodyning could be applied to the means of ionization in a similar way as described above for heterodyne control of the current in the windings. Also, heterodyne operation could also be achieved or assisted by varying the current in the windings at one frequency and the means of ionisation at a different frequency.

Figure 10A:
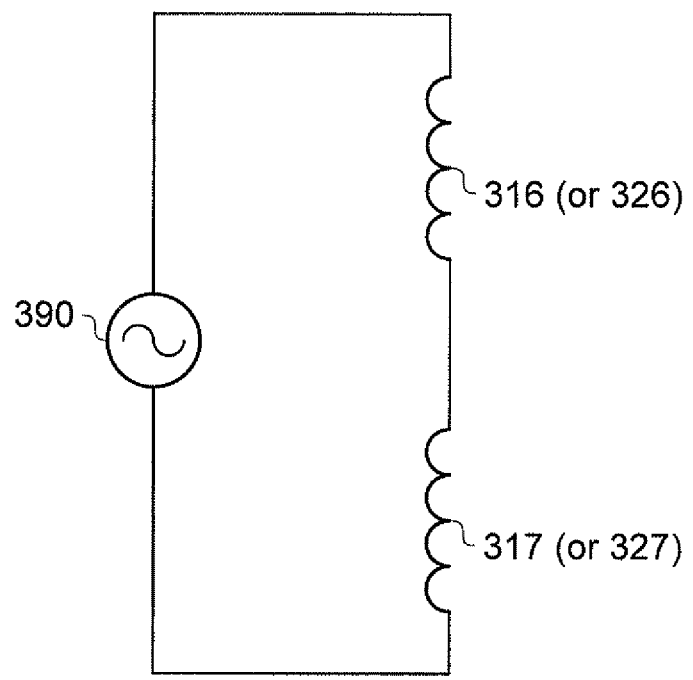

In a similar manner to that considered previously, the electrical connections may be simplified by omitting the electrical windings 326 and 327 on the inner pole piece 320. This avoids needing to install electrical conductors in the gap between the inner pole piece 320 and the outer pole piece 310. In such a case, the magnetic field between the inner pole piece 320 and the outer pole piece 310 would rely upon the windings 316 and 317 on the outer pole piece. FIG. 10A shows the circuit that would incorporate the windings 316 and 317 in order to provide an alternating magnetic field between the inner pole piece 320 and the outer pole-piece 310.

In another embodiment, the electrical connections may be simplified by omitting the electrical windings 316 and 317 on the outer pole piece 310. In such a case, the magnetic field between the inner pole piece 320 and the outer pole piece 310 would rely upon the windings 326 and 327 on the inner pole piece 320. FIG. 10A shows a circuit that would incorporate the windings 326 and 327 in order to provide an alternating magnetic field between the inner pole piece 320 and the outer pole piece 310.

Figure 11A:
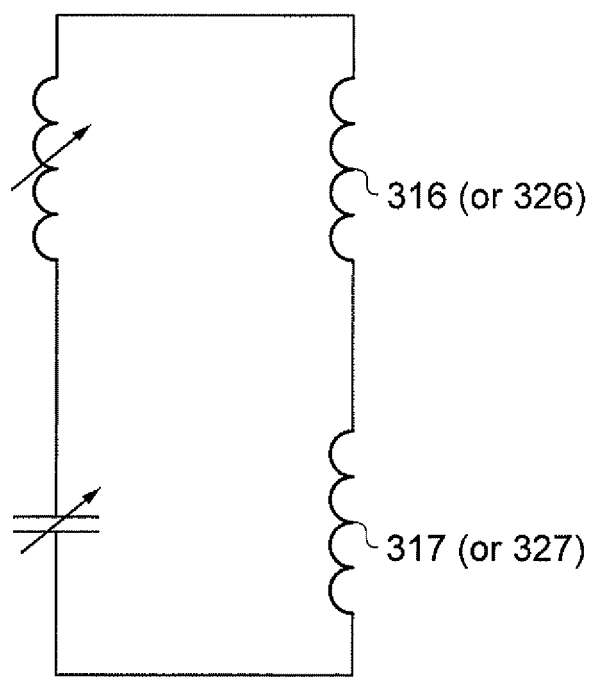
Figure 12A:
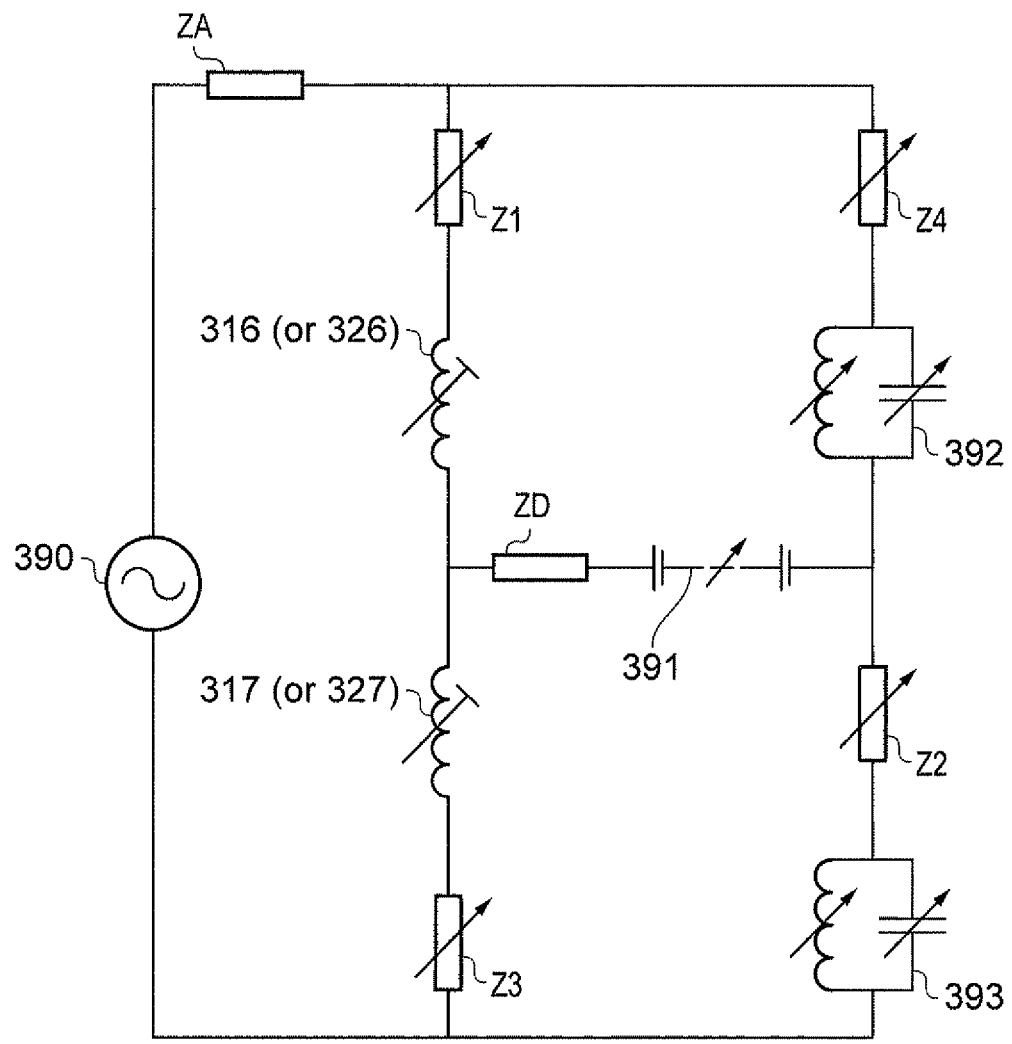

Omitting the pairs of windings 316 and 317, or 326 and 327 will require the resonant circuit shown in FIG. 11 to be modified to that shown FIG. 11A. Omitting the pairs of windings 316 and 317, or 326 and 327 will require the balanced bridge circuit shown in FIG. 12 to be modified to that shown FIG. 12A. Filters 392, 393 allow DC to flow from the DC source 391 through windings 316 (or 326) 317 (or 327) but prevent AC from the AC source 390 flowing through the DC supply. The filters 392 and 393 are shown as parallel resonant circuits but any filter that provides a low impedance to the DC and a high impedance to the AC from the source would be suitable.

The high-temperatures that the combustion controller 1 is exposed to during use may adversely affect its performance. There are a number of ways of mitigating this. These include: coating the surfaces with refractory materials such as thermal barrier coatings, using high-temperature insulation in the electrical windings such as glass fibre, applying similar techniques to those used in fire-resistance cables to protect the electrical windings, using high-temperature conductors such as tungsten for the windings.

If the combustion controller is on board a vehicle, the electric current supply for the windings can be provided by an on-board source such as a generator driven by an engine remaining in service, an auxiliary power unit, an emergency battery or, in the case of an aircraft, ram-air turbines. Inducing an alternating annular current 350 into the combustible fluid introduces energy into fluid. This allows the fluid to be ignited more easily. The combustion controller 301 can therefore assist reignition in-flight. The combustion controller can also assist ignition when starting the engine of a grounded aircraft. In this situation the power supply 390 for the windings may be provided by airport services.

If the combustion controller is used on land, for example in a power station, a furnace or a waste incineration plant, the electrical current supply for the windings could be supplied from the mains electricity supply to the plant in question.

Rectification may be needed to provide DC if the sources on board a vehicle or on land are AC. Frequency conversion may also be necessary to provide a suitable frequency of AC to the windings of the combustion controller for various electromagnetic effects.

FIG. 13 shows a fifth embodiment of a combustion controller 401 according to the present invention. This is similar to the fourth embodiment except that the separating portions 415, 425 are made from a permanent magnetic material. This ensures that there is always a radial magnetic field 440 present. This helps to ensure that a Lorentz force is always acting on the flame to hold it in place.

Although in the foregoing embodiments it has been described that the flow path defined by the opening 30 is annular this is not essential. In other embodiments the flow path in a direction perpendicular to the flow direction may be a closed loop of any shape such that current can flow entirely in the flame.

However, with reference to FIG. 14, in yet a further embodiment the combustible fluid and flame 584 does not flow in a closed loop. Instead, electrodes 592, 594 are provided that allow the flow of current 550 through the flame 584. However, the basic principle is the same. The flame 584 flows through a magnetic field 540 generated by two magnetic poles 510, 520. The magnetic poles may be permanent magnets or may be electromagnets. It may be desirable to use AC electromagnets so that a varying magnetic field is produced for resonant cyclotron absorption, heterodyning or for other control purposes as described previously. The magnetic field induces a current 550 in the flame 584 which flows through the flame between the two electrodes 592, 594. The current 550 provides electrical energy to the flame and or fluid which can assist in relight or can promote or inhibit certain chemical reactions.

The combustion controllers 101, 201, 301, 401 and 501 use an electromagnetic Lorentz force to produce a flame holding force 86. Varying the strength of the flame holding force 86 will affect the sound emitted by the flame and this may be used to reduce acoustic noise and also suppress "rumble". Rumble is a troublesome low frequency unwanted variation in combustion. The flame holding force 86 could be varied by controlling the magnetic field 40 and also by controlling the frequency of the alternating annular currents 50. A control system may be provided which monitors acoustic noise and rumble and adjusts the flame holding force 86 accordingly.

FIG. 15 shows a turbofan gas turbine engine 600 comprising in flow series an intake 602, a fan section 604, a compressor section 606, a combustion section 608, a turbine section 610 and an exhaust 612. The fan section 602 comprises a fan 614. The compressor section 604 comprises an intermediate pressure compressor 616 and a high pressure compressor 618. The turbine section 610 comprises a high pressure turbine 620, an intermediate pressure turbine 622 and a low pressure turbine 624. The low pressure turbine 624 is arranged to drive the fan 614 via a first shaft 626. The intermediate pressure turbine 622 is arranged to drive the intermediate pressure compressor 616 via a second shaft 628 and the high pressure turbine 620 is arranged to drive the high pressure compressor 618 via a third shaft 630. The combustion section 608 comprises an annular combustion chamber 632 and a plurality of fuel burners 634 are arranged to supply fuel into the annular combustion chamber 632. A fuel supply, fuel tank, 636 is arranged to supply fuel to the fuel burners 634 via a fuel pipe 638. The annular combustion chamber 632 comprises a flameholder according to the present invention as discussed with reference to FIGS. 2 to 12.

The combustion controllers 101, 201, 301, 401 and 501 have been described with reference to a gas turbine engine. However, they may be used with other combustion systems such as oil burners and pulverised fuel burners used in such installations as power station boilers, space heating boilers and refuse incinerators, for example. These burners can also suffer from rumble and flame failure. Flame failure can be particularly troublesome when burning fuel of low or variable calorific value such as municipal refuse or coal with a high ash content. Inducing an alternating annular current 50 into the flame can therefore help stabilise the flame and also re-ignite the flame in marginal conditions.

It is to be noted that in the embodiments in FIGS. 3, 6, 7, 9 and 13 the inner and outer pole pieces are designed to establish an MPD current in the centre of the magnetic, or electromagnetic, combustion controller 1, 101, 201, 301 and 401 by making the magnetic flux density at the centre of the magnetic, or electromagnetic, combustion controller much higher than elsewhere. The magnetic flux density is made much higher at the centre of the combustion controller by arranging the magnetic flux at the centre of the magnetic, or electromagnetic, combustion controller to be the sum of the magnetic fluxes at the two opposite ends, the inlet and the outlet, of the magnetic, or electromagnetic, combustion controller and by arranging the air gap in the centre of the magnetic, or electromagnetic, combustion controller to have a much smaller cross-sectional area than the air gap at the two opposite ends, the inlet and the outlet, of the magnetic, or electromagnetic, combustion controller.

In particular the first recess on the inner surface of the first pole piece is spaced from the inlet by an inlet portion of the inner surface of the first pole piece, the first recess is spaced from the second recess on the inner surface of the first pole piece by a separating portion of the inner surface of the first pole piece, the second recess on the inner surface of the first pole piece is spaced from the outlet by an outlet portion of the inner surface of the first pole piece, the length of the separating portion is less than the length of the inlet portion and the length of the separating portion is less than the length of the outlet portion. The first recess on the inner surface of the first pole piece is spaced from the inlet by an inlet portion of the inner surface of the first pole piece, the first recess is spaced from the second recess on the inner surface of the first pole piece by a separating portion of the inner surface of the first pole piece, the second recess on the inner surface of the first pole piece is spaced from the outlet by an outlet portion of the inner surface of the first pole piece, the cross-sectional area of the separating portion is less than the cross-sectional area of the inlet portion and the cross-sectional area of the separating portion is less than the cross-sectional area of the outlet portion.

The first recess on the outer surface of the second pole piece is spaced from the inlet by an inlet portion of the outer surface of the second pole piece, the first recess is spaced from the second recess on the outer surface of the second pole piece by a separating portion of the outer surface of the second pole piece, the second recess on the outer surface of the second pole piece is spaced from the outlet by an outlet portion of the outer surface of the second pole piece, the length of the separating portion is less than the length of the inlet portion and the length of the separating portion is less than the length of the outlet portion. The first recess on the outer surface of the second pole piece is spaced from the inlet by an inlet portion of the outer surface of the second pole piece, the first recess is spaced from the second recess on the outer surface of the second pole piece by a separating portion of the outer surface of the second pole piece, the second recess on the outer surface of the second pole piece is spaced from the outlet by an outlet portion of the outer surface of the second pole piece, the cross-sectional area of the separating portion is less than the cross-sectional area of the inlet portion and the cross-sectional area of the separating portion is less than the cross-sectional area of the outlet portion.

The invention claimed is:

1. A combustion controller for controlling the combustion of a flow of combustible and/or combusting fluid, comprising:
   an inlet and an outlet defining a flow path between them, and
   a magnetic-field generator arranged to generate a magnetic field across the flow path, the magnetic-field generator comprises a first pole piece having a cavity within which a second pole piece is located in such a way that an opening is formed between the first and second pole pieces which in use provides the flow path for the fluid and across which the magnetic field is generated,
   wherein in use the fluid flows in the flow path through the magnetic field, which then induces a flow of electric current in the fluid, thereby supplying energy to the fluid, the flow path is in the form of a closed loop in a plane perpendicular to the flow direction such that in use the induced current can flow in a closed loop entirely within the fluid, and
   wherein the first pole piece has a first recess and a second recess on an inner surface and the second pole piece has a first recess and a second recess on an outer surface.

2. A combustion controller according to claim 1, wherein the first pole piece is generally annular and the second pole piece is generally cylindrical, the first and second pole pieces being concentric, so that the flow path is annular in the plane perpendicular to the flow direction.

3. A combustion controller according to claim 1, wherein the magnetic-field generator comprises an electromagnet.

4. A combustion controller according to claim 3, wherein the magnetic-field generator generates an alternating magnetic field.

5. A combustion controller for controlling the combustion of a flow of combustible and/or combusting fluid, comprising:
   an inlet and an outlet defining a flow path between them, and
   a magnetic-field generator arranged to generate a magnetic field across the flow path, the magnetic-field generator comprises a first pole piece having a cavity within which a second pole piece is located in such a way that an opening is formed between the first and second pole pieces which in use provides the flow path for the fluid and across which the magnetic field is generated,
wherein in use the fluid flows in the flow path through the magnetic field, which then induces a flow of electric current in the fluid, thereby supplying energy to the fluid, the flow path is in the form of a closed loop in a plane perpendicular to the flow direction such that in use the induced current can flow in a closed loop entirely within the fluid,
wherein the magnetic-field generator comprises an electromagnet,
wherein the magnetic-field generator generates an alternating magnetic field, and
wherein the alternating magnetic field is combined with a steady magnetic field and the steady magnetic field is always in the same direction.

6. A combustion controller according to claim 4, wherein the alternating magnetic field is a combination of two or more frequencies.

7. A combustion controller according to claim 1, wherein the magnetic-field generator comprises first and second electromagnets, each including a pole piece and a winding.

8. A combustion controller according to claim 7, wherein the magnetic field generator further comprises a pair of permanent magnets.

9. A combustion controller according to claim 1, wherein the first recess on the inner surface of the first pole piece is spaced from the inlet by an inlet portion of the inner surface of the first pole piece, the first recess is spaced from the second recess on the inner surface of the first pole piece by a separating portion of the inner surface of the first pole piece, the second recess on the inner surface of the first pole piece is spaced from the outlet by an outlet portion of the inner surface of the first pole piece, the length of the separating portion is less than the length of the inlet portion and the length of the separating portion is less than the length of the outlet portion.

10. A combustion controller according to claim 1, wherein the first recess on the outer surface of the second pole piece is spaced from the inlet by an inlet portion of the outer surface of the second pole piece, the first recess is spaced from the second recess on the outer surface of the second pole piece by a separating portion of the outer surface of the second pole piece, the second recess on the outer surface of the second pole piece is spaced from the outlet by an outlet portion of the outer surface of the second pole piece, the length of the separating portion is less than the length of the inlet portion and the length of the separating portion is less than the length of the outlet portion.

11. A combustion controller according to claim 1, wherein a first winding is located in the first recess and a second winding is located in the second recess of the first pole piece.

12. A combustion controller according to claim 1, wherein a first winding is located in the first recess and a second winding is located in the second recess of the second pole piece.

13. A combustion controller according to claim 11, wherein the first recess is spaced from the second recess on the inner surface of the first pole piece by a separating portion, and the separating portion of the first pole piece between the first recess and the second recess of the first pole piece comprises a permanent magnet.

14. A combustion controller according to claim 12, wherein the first recess is spaced from the second recess on the outer surface of the second pole piece by a separating portion, and the separating portion of the second pole piece between the first recess and the second recess comprises a permanent magnet.

15. A combustion controller according to claim 1, wherein at least one fuel burner is located within the inlet between the first pole piece and the second pole piece.

16. A combustion controller according to claim 15, wherein a plurality of fuel burners are located within the inlet between the first pole piece and the second pole piece.

17. A combustion controller according to claim 15, wherein the at least one fuel burner is positioned upstream of the magnetic field generator.

18. A gas turbine engine comprising a combustion controller according to claim 1, wherein the gas turbine engine includes at least one compressor, at least one turbine and at least one shaft, the at least one turbine being arranged to drive the at least one compressor by the at least one shaft.

19. A combustion controller for controlling the combustion of a flow of combustible and/or combusting fluid, comprising:
a magnetic-field generator, the magnetic field generator comprising a first pole piece and a second pole piece, the first pole piece having a cavity, the second pole piece being located in the cavity in the first pole piece,
the first and second pole pieces defining an opening therebetween, the opening forming a flow path for the fluid, the flow path having an inlet and an outlet, the flow path being in the form of a closed loop in a plane perpendicular to a flow direction of the fluid between the inlet and the outlet of the flow path,
the magnetic field generator being arranged to generate a magnetic field across a flow path, and
at least one fuel burner being located within the inlet between the first pole piece and the second pole piece or at least one fuel burner being positioned upstream of the magnetic field generator or a fuel supply conduit being positioned upstream of the inlet between the first pole piece and the second pole piece,
wherein the first pole piece has a first recess and a second recess on an inner surface and the second pole piece has a first recess and a second recess on an outer surface.

20. A combustion controller according to claim 1, wherein the opening is in the form of a closed loop in the plane perpendicular to the flow direction.

21. A combustion controller according to claim 19, wherein the opening is in the form of a closed loop in the plane perpendicular to the flow direction.

* * * * *